United States Patent [19]
Cox et al.

[11] Patent Number: 6,119,726
[45] Date of Patent: Sep. 19, 2000

[54] APPARATUS FOR EFFECTING TRANSFER OF FLUID FROM ANY ONE OF A PLURALITY OF FLUID SOURCES TO A SINGLE FLUID OUTLET

[75] Inventors: Nigel Cox, Cheshire; John Keeler, North Haven, both of Conn.

[73] Assignee: Warner Instrument Corporation, Hamden, Conn.

[21] Appl. No.: 09/339,509

[22] Filed: Jun. 24, 1999

[51] Int. Cl.[7] .................................................. F16K 11/02
[52] U.S. Cl. ...................................... 137/625.17; 137/239
[58] Field of Search .......................... 137/625.11, 625.17, 137/239

[56]    References Cited

U.S. PATENT DOCUMENTS

| | | |
|---|---|---|
| 1,804,921 | 5/1931 | Ellyson . |
| 3,363,651 | 1/1968 | Boyd . |
| 3,399,698 | 9/1968 | Bentley . |
| 3,530,764 | 9/1970 | Tomita . |
| 3,540,475 | 11/1970 | Clark . |
| 3,618,637 | 11/1971 | Santomieri .................... 137/625.41 |
| 3,774,634 | 11/1973 | Bonney . |
| 4,171,571 | 10/1979 | Gritter . |
| 4,191,213 | 3/1980 | Dolling et al. ................. 137/625.17 |
| 4,253,380 | 3/1981 | McConnell . |
| 4,253,494 | 3/1981 | Cooke . |
| 4,411,291 | 10/1983 | Lew . |
| 4,564,043 | 1/1986 | Trittler ........................... 137/624.18 |
| 4,577,660 | 3/1986 | Haga . |
| 4,614,204 | 9/1986 | Dolejs . |
| 4,625,763 | 12/1986 | Schick . |
| 4,632,149 | 12/1986 | Oroskar . |
| 4,633,904 | 1/1987 | Schumann . |
| 5,690,069 | 11/1997 | Huwarts . |
| 5,810,034 | 9/1998 | Cristea . |

OTHER PUBLICATIONS

Photocopy of p. 34 of Applicant's Product Catalog showing "Perfusion Manifolds". These Perfusion Manifolds were in existence and marketed before Jun. 24, 1999.

*Primary Examiner*—John Fox
*Attorney, Agent, or Firm*—Raymond A. Nuzzo

[57]          ABSTRACT

An apparatus and method for effecting transfer of fluid from any one of a plurality of fluid sources to single fluid outlet. The apparatus comprises a valve head having (i) a bore longitudinally extending therethrough, (ii) a plurality of radially extending fluid channels, each channel having an inlet in fluid communication with a corresponding fluid source and an outlet in communication with the bore, and (iii) a valve head fluid outlet in communication with the bore, a valve stem movably disposed within the bore of the valve head, the valve stem having an axially extending fluid channel that has a fluid outlet in communication with the valve head fluid outlet and a fluid inlet, and a valve control system for effecting rotation and axial displacement of the valve stem so as to effect or terminate fluid communication between the valve stem fluid inlet and a fluid outlet of any one of the radially extending fluid channels. The valve control system is configured to effect rotation of the valve stem from a current position directly to any other position without stopping at intervening positions. In a preferred embodiment, the valve head further includes a longitudinally extending channel that has an inlet coupled to the bore and an outlet coupled to a vacuum source to effect removal of fluid residue from the bore.

20 Claims, 6 Drawing Sheets

APPARATUS FOR EFFECTING TRANSFER OF FLUID FROM ANY ONE OF A PLURALITY OF FLUID SOURCES TO A SINGLE FLUID OUTLET

BACKGROUND OF THE INVENTION

1. Field of the Invention

The present invention generally relates to an apparatus for effecting transfer of fluid from any one of a plurality of fluid sources to a single fluid outlet.

2. Problem to be Solved

During laboratory testing or manufacturing processes involving the application of different chemicals, it is often necessary to apply different fluids or solutions to a particular location, e.g. biological chamber, cellular or tissue area, test tube or other receptacle. It is also necessary that each solution applied is pure and not contaminated with any of the other solutions. Furthermore, it may be necessary to apply different solutions at specific times and for specific time durations.

Therefore, it is an object of the present invention to provide a novel apparatus that address the needs discussed above.

Other objects and advantages of the present invention will be apparent to one of ordinary skill in the art in light of the ensuing description of the present invention.

SUMMARY OF THE INVENTION

The present invention is directed to, in a first aspect, an apparatus for effecting transfer of fluid from any one of a plurality of fluid sources to a single fluid outlet. The apparatus comprises a valve head having (i) a bore longitudinally extending therethrough, (ii) a plurality of radially extending fluid channels, each channel having an inlet in fluid communication with a corresponding fluid source and an outlet in communication with the bore, and (iii) a valve head fluid outlet in communication with the bore, a valve stem movably disposed within the bore of the valve head, the valve stem having an axially extending fluid channel that has a fluid outlet in communication with the valve head fluid outlet and a fluid inlet, and a valve control system for effecting rotation and axial displacement of the valve stem so as to effect fluid communication between the valve stem fluid inlet and a fluid outlet of any one of the radially extending fluid channels, the valve control system being configured to (i) retract the valve stem to terminate fluid communication between the valve stem fluid inlet and a fluid outlet of one of the radially extending fluid channels, (ii) rotate the valve stem so that the valve stem fluid inlet is aligned with a fluid outlet of a particular radially extending fluid channel, and (iii) axially displacing the valve stem so as to effect fluid communication between the valve stem fluid inlet and the fluid outlet of the particular radially extending fluid channel.

In a related aspect, the present invention is directed to a method for effecting transfer of fluid from any one of a plurality of fluid sources to a single fluid outlet, comprising:

a) providing an apparatus comprising a valve head having (i) a bore longitudinally extending therethrough, (ii) a plurality of radially extending fluid channels, each channel having an inlet in fluid communication with a corresponding fluid source and an outlet in communication with the bore, and (iii) a valve head fluid outlet in communication with the bore, a valve stem movably disposed within the bore of the valve head, the valve stem having an axially extending fluid channel that has a fluid outlet in communication with the valve head fluid outlet and a fluid inlet, and a valve control system for effecting rotation and axial displacement of the valve stem so as to effect fluid communication between the valve stem fluid inlet and a fluid outlet of any one of the radially extending fluid channels;

b) retracting the valve stem to terminate fluid communication between the valve stem fluid inlet and a fluid outlet of one of the radially extending fluid channels, c) rotating the valve stem so that the valve stem fluid inlet is aligned with a fluid outlet of a particular radially extending fluid channel; and d) axially displacing the valve stem so as to effect fluid communication between the valve stem fluid inlet and the fluid outlet of the particular radially extending fluid channel.

BRIEF DESCRIPTION OF THE DRAWINGS

The features of the invention are believed to be novel and the elements characteristic of the invention are set forth with particularity in the appended claims. The invention itself may best be understood by reference to the detailed description which follows taken in conjunction with the accompanying drawings in which:

DESCRIPTION OF THE PREFERRED EMBODIMENTS

In describing the preferred embodiments of the present invention, reference will be made herein to FIGS. 1–13 of the drawings in which like numerals refer to like features of the invention. It is to be understood that the drawings are not to scale.

1) Valve Unit 14

Figure 1:
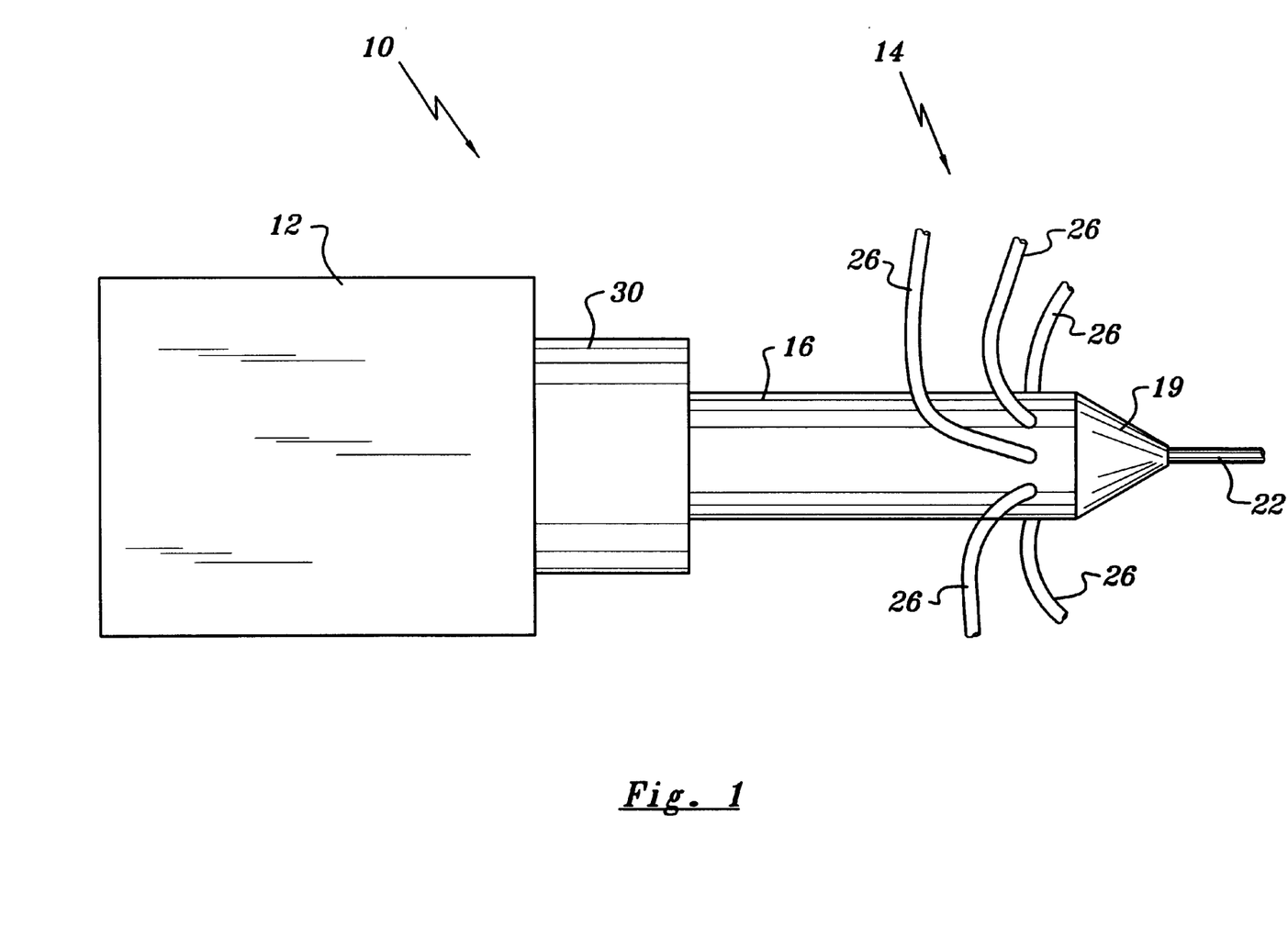
FIG. 1 is a block diagram of the apparatus of the present invention.

Referring to FIG. 1, apparatus 10 of the present invention generally comprises valve control unit 12 and valve unit 14. To facilitate understanding of the present invention, the ensuing description is divided into three sections: (1) Valve Unit 14, (2) Valve Control Unit 12, and (3) Operation of Apparatus 10.

1) Valve Unit 14

Figure 3:
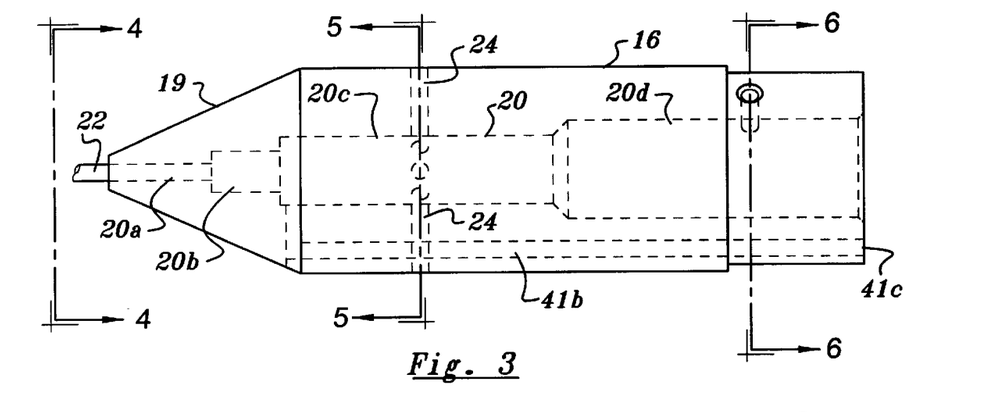
FIG. 3 is a side elevational view of a valve head shown in FIG. 1 having an inner bore, the bore being shown in phantom.
Figure 7:
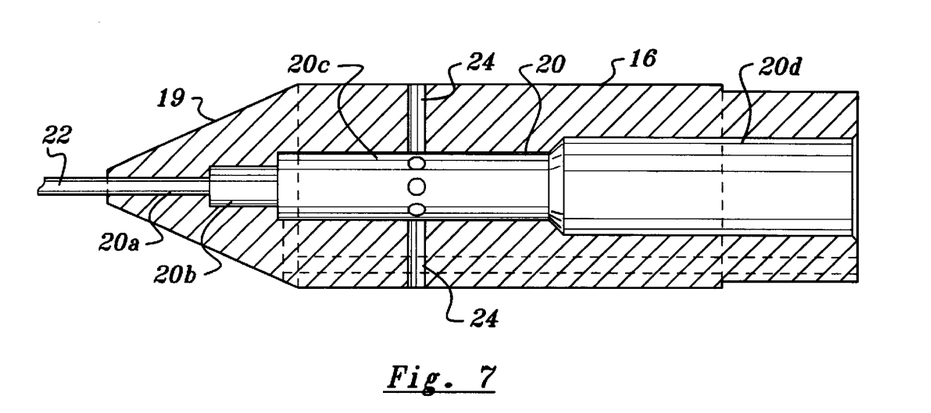
FIG. 7 is a side elevational view of the valve head, the view being the same as that shown in FIG. 3, with the inner bore now being shown in solid line in order to facilitate understanding of the structure of the valve head.

Referring to FIGS. 1, 3 and 7, valve unit 14 generally comprises stationary valve head 16 and movable valve stem 18. In a preferred embodiment, valve head 16 and valve stem 18 are substantially cylindrical in shape. Valve head 16 includes a conical shaped portion 19. Valve head further includes bore 20 that extends longitudinally for substantially the entire length of valve head 16. FIG. 3 shows bore 20 in phantom. However, to facilitate understanding of the shape and function of bore 20, FIG. 7 shows bore 20 in solid line. Bore 20 has a plurality of bore portions 20a, 20b, 20c and 20d wherein each section has a different volume. In a preferred embodiment, portions 20a, 20b, 20c and 20d all have substantially circular cross sections. Valve head 16 and valve stem 18 can be fabricated from a variety of materials, e.g. plastic, graphite, rubber, etc. In a preferred embodiment, valve head 16 and valve stem 18 are fabricated from polycarbonate. However, valve head 16 and valve stem 18 can be manufactured from other materials such as Delrin, polysulfone, teflon, plastic and graphite.

Figure 4:
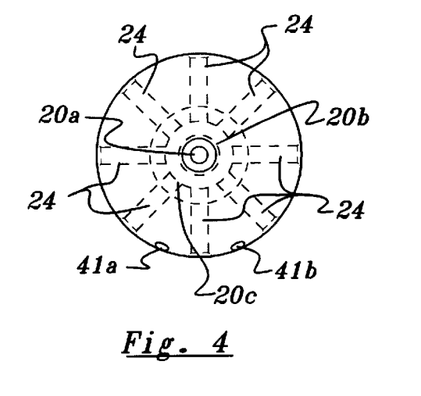
FIG. 4 is a view taken along line 4—4 of FIG. 3.
Figure 5:
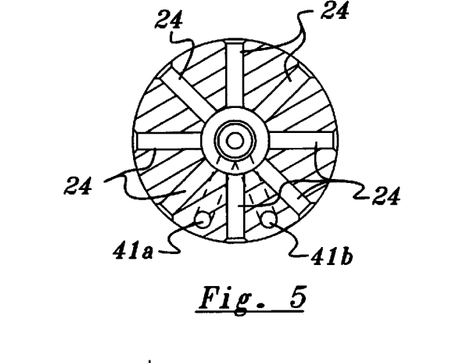
FIG. 5 is a cross-sectional view taken along line 5—5 of FIG. 3.

Referring to FIGS. 3, 4, 5 and 7, valve head 16 further includes perfusion outlet 22 that is in fluid communication with portion 20a of bore 20. Outlet 22 defines a bore therein that functions as a conduit for fluids. The purpose of outlet 22 is discussed in detail below. In a preferred embodiment, outlet 22 is fabricated from tubing. Preferably, the tubing is PE-160 type tubing. Referring to FIGS. 3, 4 and 5, valve head 16 further includes a plurality of internal, radially extending perfusion inlets or fluid channels 24 that are in communication with bore 20, or more specifically, bore portion 20c. In a preferred embodiment, channels 24 are equidistant and spaced $\theta_1$ degrees apart. The angle $\theta_1$ depends upon the number of inlets 24. For example, in one embodiment, there are eight (8) inlets 24. In such a configuration, $\theta_1$ is about 45°. It is to be understood that there can be more than or less than eight (8) perfusion inlets. Each inlet 24 functions as a fluid conduit and is fluidly coupled to a corresponding fluid conduit 26 (see FIG. 1). Each fluid conduit 26 is fluidly coupled to a particular fluid source (not shown). The fluid source can be a solution, i.e. chemical solution, or any other fluid. In a preferred embodiment, each of the fluid conduits 26 is comprised of flexible tubing. In one embodiment, fluid couplings (not shown) are fluidly coupled between each inlet 24 and each conduit 26.

Figure 2:
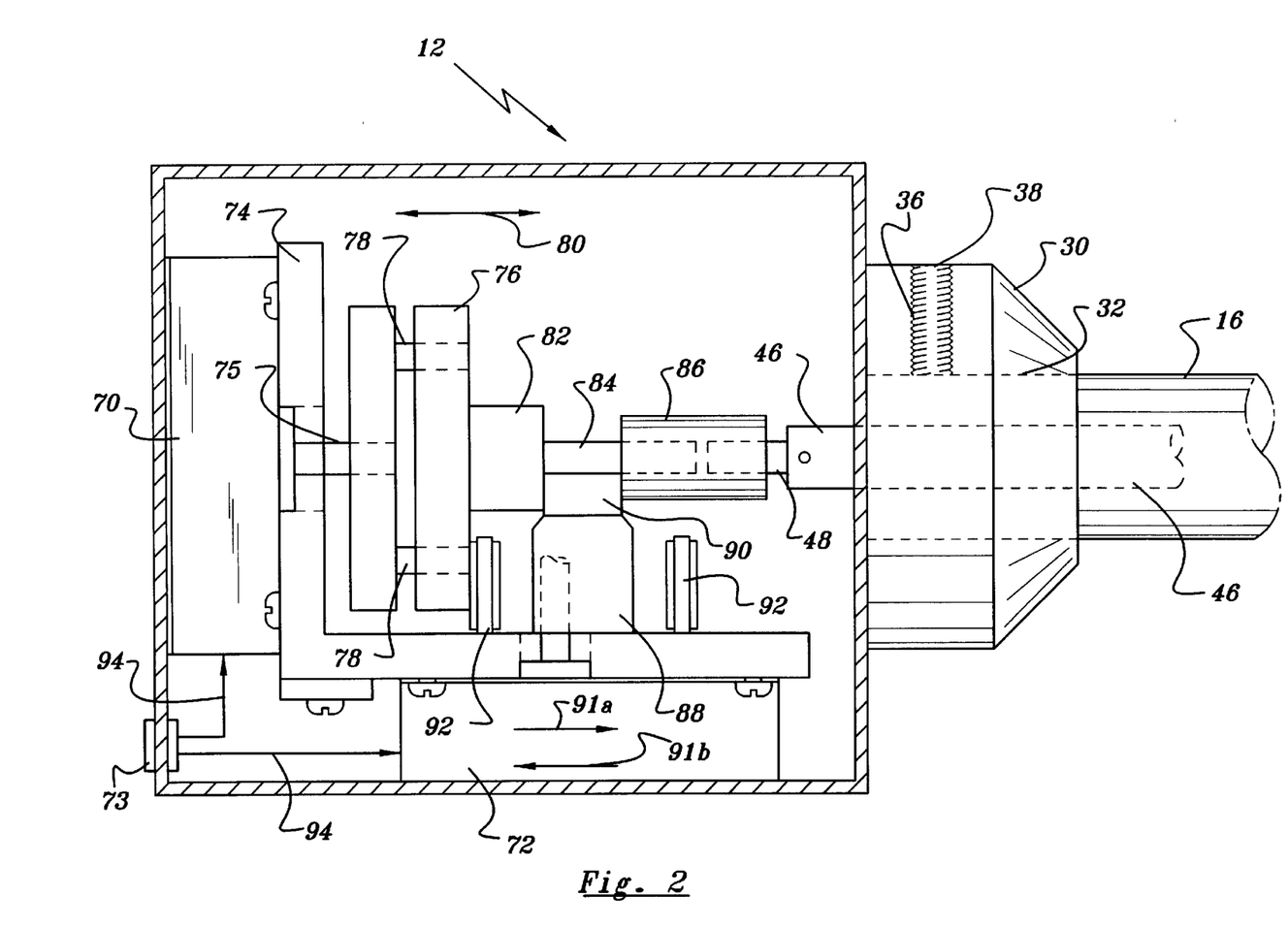
FIG. 2 is a block diagram of a valve control unit shown in FIG. 1.
Figure 6:
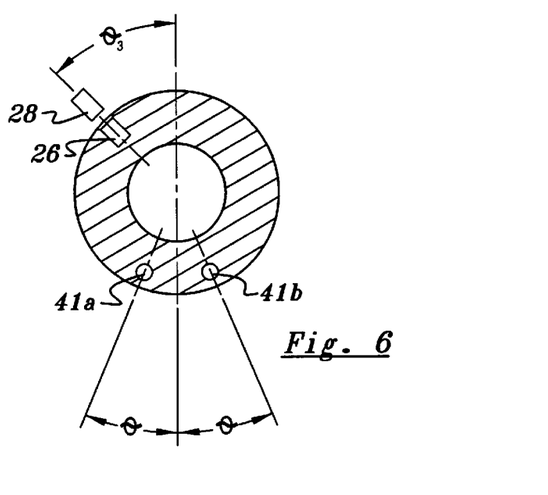
FIG. 6 is a view taken along line 6—6 in FIG. 3.
Figure 6A:
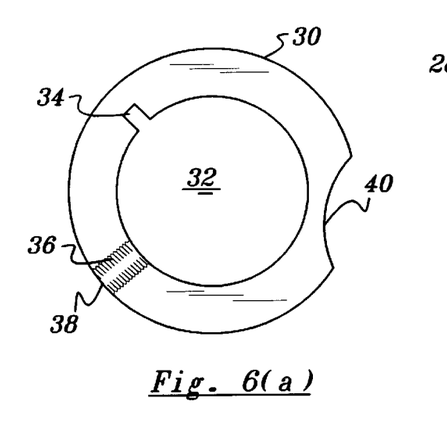
FIG. 6A is front elevational view of a retaining block for securing the valve head.

Referring to FIGS. 3, 6, and 6A valve head 16 further includes a cavity or inlet 26 for receiving a locating pin 28. Locating pin 28 is used for correctly positioning valve head 16 into a retaining block that stabilizes valve head 16 and maintains valve head 16 stationary. FIG. 6A shows a front view of one embodiment of a retaining block. Retaining block 30 includes bore 32 for receiving valve head 16 and slot 34 for receiving locating pin 28. Retaining block 30 further includes inlet 36 for receiving screw 38 for retaining valve head 16. Retaining block 30 also includes a notch 40 for receiving a portion of tubing (not shown) or other type of fluid conduit (not shown). Retaining block 30 is attached to the housing of valve control unit 12 as shown in FIG. 2. Referring to FIGS. 3, 5 and 7, valve head 16 further includes a pair of longitudinally extending fluid channels 41a and 41b. Fluid channels 41a and 41b are in fluid communication with bore portion 20c of bore 20. Each channel 41a and 41b is spaced about $\theta_2$ degrees from centerline $C_L$. In one embodiment, $\theta_2$ is about 22°. Each channel 41a and 41b is has a fluid outlet adjacent bore portion 20d. For example, fluid channel 41b has a fluid outlet 41c. Fluid outlet 41c functions as a drainage outlet. The fluid outlet of each channel 41a and 41b are gaseously coupled to a vacuum source (not shown). The vacuum source creates a suctional force (or negative pressure) that removes residue fluid from bore portion 20c. Any suitable commercially available vacuum source can be used to effect removal of fluid residue.

Figure 8:
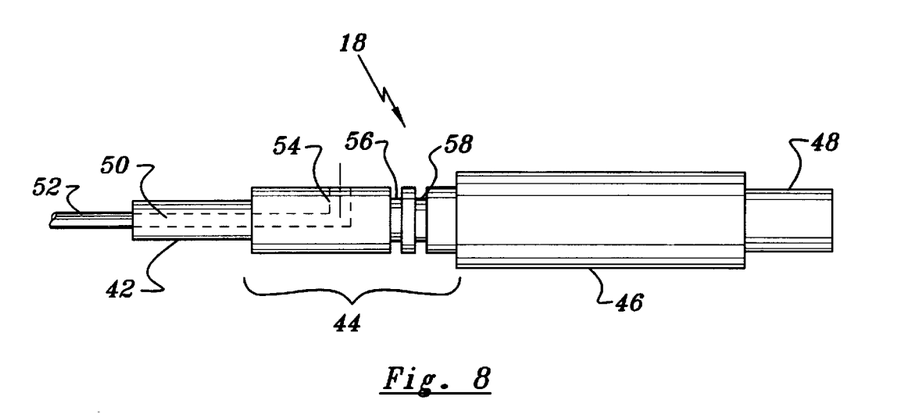
FIG. 8 is a side elevational view of a valve stem that is movably disposed within the bore in the valve head.
Figure 9:
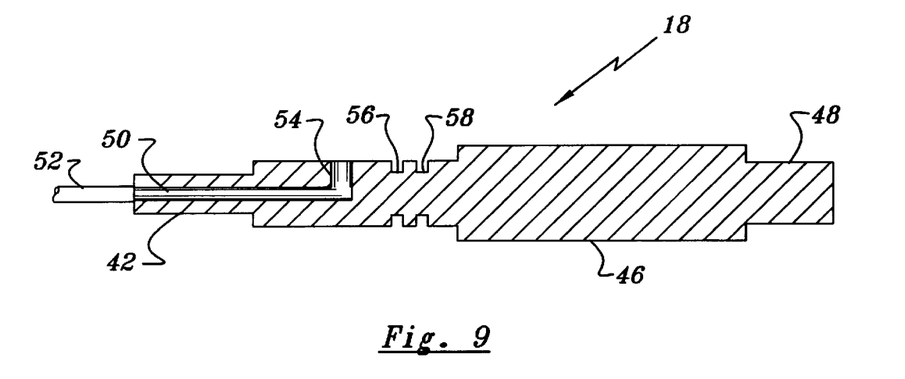
FIG. 9 is a side elevational view in cross-section of the valve stem of FIG. 8.

Referring to FIGS. 8 and 9, valve stem 18 comprises portions 42, 44, 46 and 48. Portions 42, 44 and 46 are sized for movable placement within bore portions 20b, 20c and 20d, respectively, of bore 20 (see FIGS. 3 and 7). Portion 48 is mechanically coupled to valve control unit 12. Portion 42 of valve stem 18 includes a fluid channel 50 that extends longitudinally throughout portion 42. Portion 42 further includes perfusion outlet 52 that is in fluid communication with fluid channel 50. Fluid channel 50 extends into a portion of valve stem portion 44. Portion 44 further includes a radially oriented fluid inlet 54 that is in fluid communication with fluid channel 50. Thus, fluid channel 50, perfusion outlet 52 and fluid inlet 54 form a fluid conduit whereby fluid entering fluid inlet 54 is discharged through perfusion outlet 52. Valve stem 18 is rotatable within bore 20 and can also move axially within bore 20. Valve stem 18 can be rotated so that fluid inlet 54 is in fluid communication with any of radially extending perfusion inlets 24. The purpose of such a configuration will be apparent from the ensuing discussion.

Referring to FIG. 8, portion 44 has circumferentially formed grooves 56 and 58 for receiving grease which prevents fluid leakage into bore portion 20d.

2) Valve Control Unit 12

Referring to FIG. 2, valve control unit 12 generally comprises rotational motor drive 70, axial motor drive 72, electrical input signal interface 73 and retaining block 30 (which was previously described above. Motor drives 70 and 72 are mounted to "L" shaped support member 74.

Rotational motor drive 70 includes rotating shaft 75 and shaft slider 76. Slider 76 is attached to shaft 75 and is slidably mounted upon protruding members or studs 78. Thus, slider 76 rotates with shaft 75 and can slide or move bi-directionally as indicated by arrow 80. Motor drive 70 further includes shaft mount 82 which is attached to shaft slider 76. Shaft mount 82 has a bore that is sized for receiving shaft 84. Shaft 84 is attached to mount 82 so that it rotates with mount 82. Valve head 16 is disposed within bore 32 of retaining block 30 as described above. Screw 38 is used to secure valve head 16 within bore 32. Portion 48 of valve stem 18 is mechanically coupled to shaft 84 by link 86.

Axial drive motor 72 further includes cam 88 and bearing 90. Bearing 90 is intermediate shaft mount 82 and link 86. Upon receipt of a control signal from connector 73, motor 72, cam 88 and bearing 90 cooperate to axially move shaft slider 76 as indicated by arrows 91a and 91b. Valve control unit 12 further includes rotation limiting members 92 that are attached to "L" shaped member 74. Members 92 receive cam 88 when motor drive 72 effects movement of cam 88 in the direction indicated by arrows 91a and 91b. Thus, rotation limiting members 92 limit rotation of cam 88 to 180° rotation.

In a preferred embodiment, valve control unit 12 is used with a control system such as a controller, microprocessor, computer, or other interface. Preferably, the control system comprises a controller that produces control signals for input into input signal connector 73 in order to effect rotational or axial movement of valve stem 18. In such a configuration, the signals inputted into connector 73 are routed to motor drives 70 and 72 via wires or cables 94. The software program may be configured to position valve stem 18 according to a sequence of positions stored in the computer memory, i.e. RAM (random access memory). The number of positions to which valve stem 18 may be rotated depend upon the number of perfusion inlets 24. For example, if there are eight (8) perfusion inlets 24, then valve stem 18 can be rotated to eight (8) different positions wherein when valve stem 18 is in each position, fluid inlet 54 of valve stem portion 44 is in fluid communication with a corresponding perfusion inlet 24. In order to effect such a process, the angular spacing between inlets 24 and/or the number of perfusion inlets 24 must be stored in the computer memory or entered by a user via a keyboard upon a computer display screen prompt. Thus, in the example above, if there are eight (8) equidistantly spaced inlets 24, then each inlet 24 is separated by 45°. The software can be configured to require the user to input either (i) the number of inlets 24, in which case the software will automatically calculate the angular spacing, or (ii) the number of inlets 24 and the angular spacing.

In an alternate embodiment, the controller is configured to control valve unit 12 through manual operation. In such an embodiment, a computer is not used and the controller is configured to have a plurality of push-button-type switches to allow for manual control.

In an alternate embodiment, valve control unit 12 is configured to include a microprocessor that is programmed to position valve stem 18 to the desired positions and according to a desired sequence.

In accordance with the present invention, when it is desired to effect fluid communication between fluid inlet 54 of valve stem portion 18 and a particular perfusion inlet 24, valve control unit 12 moves valve stem 18 according to the following sequence:

a) axial motor drive 72 is controlled to withdraw or move axially valve stem 18 as indicated by arrow 91 a;

b) rotation motor drive 70 rotates valve stem 18 to a desired position so that fluid inlet 54 of valve stem portion 44 is angularly aligned with a desired perfusion inlet 24;

c) axial motor drive 72 is controlled to protract or move valve stem 18 axially as indicated by arrow 91b so that fluid inlet 54 is in fluid communication with the desired perfusion inlet 24.

The vacuum source coupled to channels 41a and 41b remove any residue of previous fluids on the outer surface of valve stem 18. Thus, valve stem 18 is wiped clean and all residue of the previous fluid is sucked from bore portion 20c thereby preventing contamination with the new or next fluid to be deposited at the fluid destination.

Figure 12:
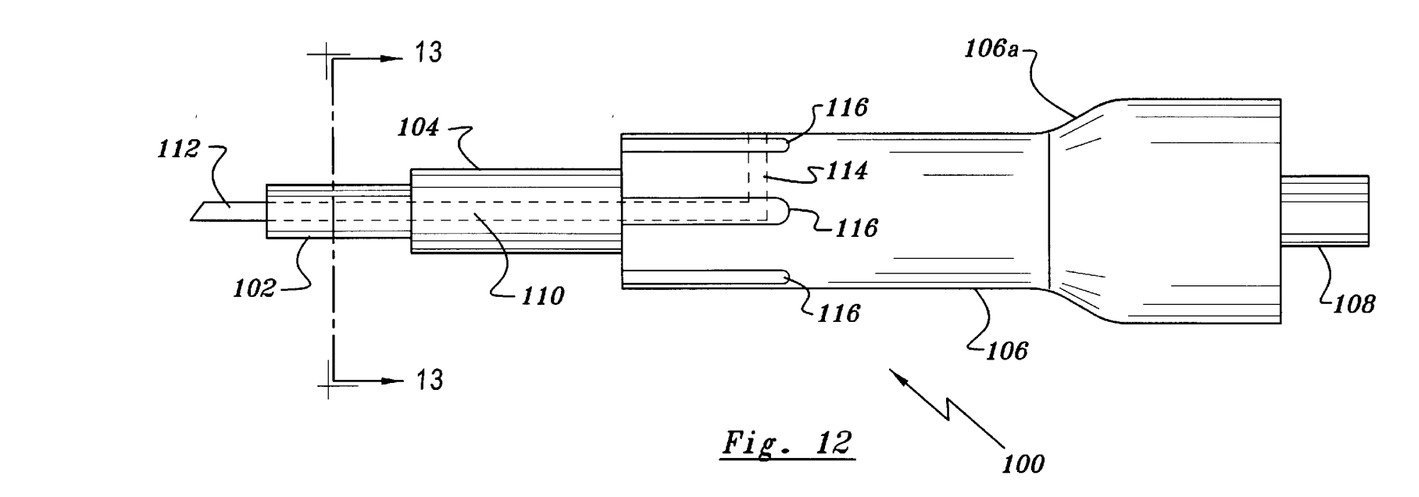
FIG. 12 is a side elevational view of an alternate valve stem.
Figure 13:
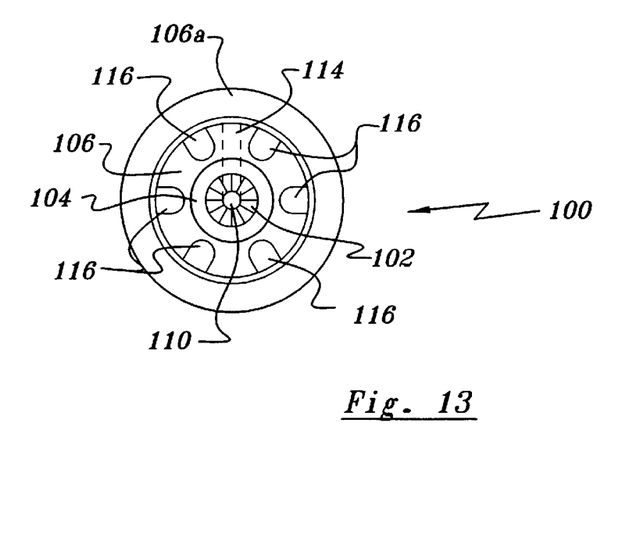
FIG. 13 is a view taken alone line 13—13 of FIG. 12.

Referring to FIGS. 12 and 13, there is shown alternate valve stem 100. Valve stem 100 comprises portions 102, 104, 106 and 108. Portions 102, 104, 106 are sized for movable placement within bore portions 20b, 20c and 20d, respectively, of bore 20 (see FIG. 3). Portion 106 has an inclined portion 106a. Portion 108 is mechanically coupled to valve control unit 12 in the same manner as portion 48 of valve stem 18. Portion 102 of valve stem 100 includes a fluid channel 110 that extends longitudinally throughout portion 102. Portion 102 further includes perfusion outlet 112 that is in fluid communication with fluid channel 110. Fluid channel 110 extends into a portion of valve stem portion 106. Portion 106 further includes a radially oriented fluid inlet 114 that is in fluid communication with fluid channel 110. Thus, fluid channel 110, perfusion outlet 112 and fluid inlet 114 form a fluid conduit whereby fluid entering fluid inlet 114 is discharged through perfusion outlet 112. Valve stem 100 is rotatable within bore 20 and can also move axially within bore 20. Valve stem 100 can be rotated so that fluid inlet 114 is in fluid communication with any of radially extending perfusion inlets 24. Valve stem 100 further comprises a plurality of channels 116. Channels 116 longitudinally extend through a portion of portion 106 of stem 100. In one embodiment, each of channels 116 has a generally semi-circular cross-section. The inlets 24 that are not fluidly coupled to inlet 114 are fluidly coupled to a corresponding channel 116. When valve stem 100 is retracted by control unit 14, the vacuum produced by the vacuum source coupled to the outlets of drainage channels 41a and 41b create a suction (or negative pressure) that effects removal of fluid residue from the inlets 24 which are not coupled to fluid inlet 114. The fluid residue exits valve head 16 through the outlets of drainage channels 41a and 41 b. The number of channels 116 used depends upon the number of inlets 24 that are being used. The number of channels 116 preferably one less than the number of inlets 24 since fluid inlet 114 is fluidly connected to one of the inlets 24.

Operation

The ensuing description pertains to the operation and functioning of apparatus 10 and the interrelation and cooperation of all the components and features discussed above.

Apparatus 10 of the present invention precisely transfers predetermined amounts of different fluids or solutions from corresponding fluid sources to a single fluid outlet according to a predetermined sequence or order. There is no contamination of a current fluid being transferred through apparatus 10 with the residue of a previously transferred fluid.

Figure 10:
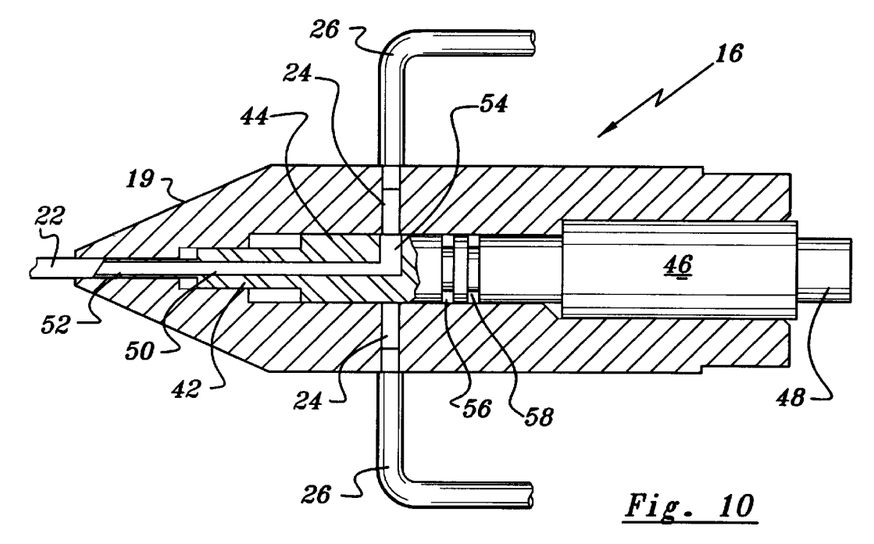
FIG. 10 is a side elevational view, partially in cross-section, of the valve stem disposed within the bore of the valve head, the valve stem being positioned in a first position.

Referring to FIGS. 1 and 10, each perfusion inlet 24 is in fluid communication with a corresponding fluid conduit 26. Each conduit 26 is in fluid communication with a particular fluid source or solution. Perfusion outlet 22 is in fluid communication with a particular destination, i.e. biological chamber, etc. As shown in FIG. 10, valve stem 18 is positioned so that fluid inlet 54 is in fluid communication with perfusion inlet 24 and perfusion outlet is in fluid communication with perfusion outlet 22. The desired fluid or solution then flows through: (i) fluid conduit 26, (ii) a perfusion inlet 24, (iii) fluid inlet 54, (iv) fluid channel 50, (v) perfusion outlet 52, and (vi) perfusion outlet 22.

Figure 11:
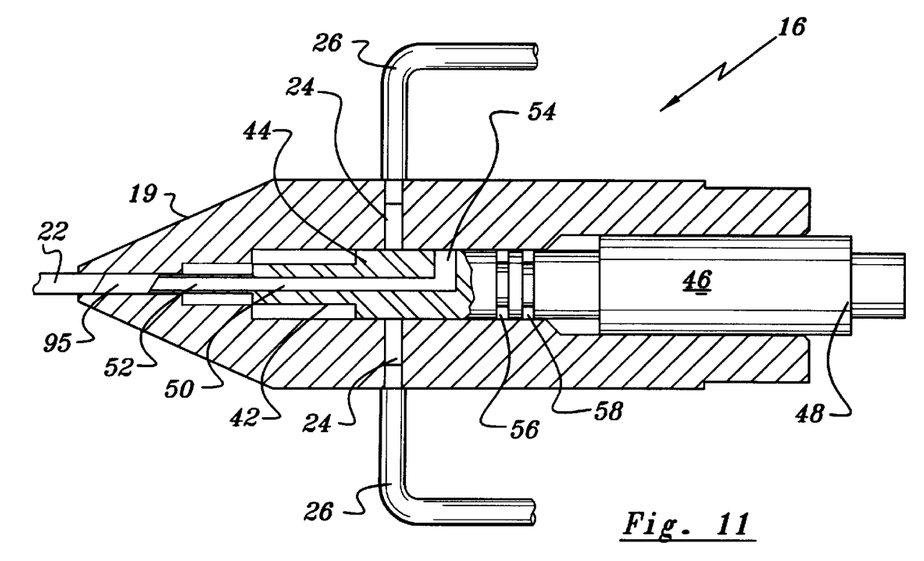
FIG. 11 is a view similar to that shown in FIG. 10 wherein the valve stem is in a second position.

When it is desired to deposit a different fluid or solution to the particular destination, valve control unit 12 is controlled so that axial drive motor 72 retracts or withdraws valve stem 18 in the direction indicated by arrow 91 a (see FIG. 2). Such action terminates fluid communication between the perfusion inlet 24 and fluid inlet 54, creates gap 95 between perfusion outlets 22 and 52, and creates a distance between fluid inlet 54 from all of the perfusion inlets 24. After valve stem 18 is retracted, it is positioned as shown in FIG. 11. As valve stem 18 is withdrawn or retracted, the suction created by the vacuum source coupled to channels 41a and 41b effects removal of any residue of the previous fluid from bore portion 20c. Furthermore, the vacuum prevents the build-up of any residue of previous fluids on the outer surface of valve stem 18 as described above.

Immediately after valve stem 18 is withdrawn, rotational motor drive 70 is controlled to rotate valve stem 18 to a new predetermined position so that fluid channel 54 is aligned with a desired or next perfusion inlet 24. Next, axial motor drive 72 is controlled to axially move valve stem 18 in the direction indicated by arrow 91b to effect fluid communication between the desired perfusion inlet 24 and fluid inlet 54. After this step, valve stem 18 is positioned, as shown in FIG. 10. Since there is no residue of the previous fluid in fluid channel 50 and fluid inlet 54, there is no contamination of the previous fluid and the new fluid. Contamination is also prevented by rotating valve stem 18 directly to a new position without having to stop at intervening positions. When the desired amount of the new fluid is deposited at the fluid destination, the valve stem 18 is retracted as described above and the process is repeated.

Thus, system 10 of the present invention:
a) delivers or transfers different fluids or solutions, in a consecutive manner, to a particular destination;
b) substantially eliminates contamination of a new fluid or solution from a previously transferred fluid or solution;
c) can be used either in a manual mode or with a personal computer that executes a software program to automate the functioning of apparatus 10;
d) can be assembled and/or fabricated from commercially available components and materials; and
e) can be manufactured at a reasonable cost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as failing within the true scope and spirit of the present invention.

Thus, having described the invention, what is claimed is:

1. An apparatus for effecting transfer of fluid from any one of a plurality of fluid sources to a single fluid outlet, comprising:
   a valve head having (i) a bore longitudinally extending therethrough, (ii) a plurality of radially extending fluid channels, each channel having an inlet in fluid communication with a corresponding fluid source and an outlet in communication with the bore, and (iii) a valve head fluid outlet in communication with the bore;
   a valve stem movably disposed within the bore of the valve head, the valve stem having an axially extending fluid channel that has a fluid outlet in communication with the valve head fluid outlet and a fluid inlet; and
   a valve control system for effecting rotation and axial displacement of the valve stem so as to effect fluid communication between the valve stem fluid inlet and a fluid outlet of any one of the radially extending fluid channels, the valve control system being configured to (i) retract the valve stem to terminate fluid communication between the valve stem fluid inlet and a fluid outlet of one of the radially extending fluid channels, (ii) rotate the valve stem so that the valve stem fluid inlet is aligned with a fluid outlet of a particular radially extending fluid channel, and (iii) axially displacing the valve stem so as to effect fluid communication between the valve stem fluid inlet and the fluid outlet of the particular radially extending fluid channel.

2. The apparatus according to claim 1 wherein the valve head further includes at least one longitudinally extending drainage channel having an inlet and an outlet, the inlet being fluidly coupled to the bore of the valve head.

3. The apparatus according to claim 1 wherein the valve control system is configured to effect rotation of the valve stem from a current position directly to any other position without stopping at intervening positions.

4. The apparatus according to claim 2 further including a vacuum source coupled to the outlet of the longitudinally extending drainage channel so as to create a suction that removes residue fluid from the bore of the valve head.

5. The apparatus according to claim 1 wherein the valve head and valve stem have substantially circular cross sections.

6. The apparatus according to claim 1 wherein the valve stem has a longitudinally extending axis, the valve stem fluid inlet extending radially from the axis.

7. The apparatus according to claim 1 wherein the valve control unit further comprises:
   a housing;
   a retaining block attached to the housing, the retaining block having a bore sized for receiving the valve head; and
   means for removably securing the valve head to the retaining block.

8. The apparatus according to claim 1 wherein the plurality of radially extending channels comprises eight (8) radially extending channels.

9. The apparatus according to claim 1 wherein the valve head comprises an upper longitudinally extending portion and a lower longitudinally extending portion, the valve head further including at least one longitudinally extending fluid channel located in the lower longitudinally extending portion and having a fluid inlet in communication with the valve head bore and a fluid outlet for draining residue fluid.

10. The apparatus according to claim 1 wherein the valve stem has at least one circumferentially formed groove for receiving a lubricant to facilitate movement of the valve stem within the valve head bore.

11. The apparatus according to claim 1 wherein the valve control unit comprises a first motor drive for rotating the valve stem and a second motor drive for axially displacing the valve stem.

12. The apparatus according to claim 11 wherein the valve control unit further includes an electrical signal interface for receiving externally generated control signals and feeding the signals to the first and second motor drives.

13. The apparatus according to claim 12 wherein the valve control unit further includes a programmable controller for producing the externally generated control signals.

14. The apparatus according to claim 1 wherein the valve head and valve stem are fabricated from a material chosen from polycarbonate, Delrin, polysulfone, teflon, plastic and graphite.

15. A method for effecting transfer of fluid from any one of a plurality of fluid sources to a single fluid outlet, comprising:
   a) providing an apparatus comprising a valve head having (i) a bore longitudinally extending therethrough, (ii) a plurality of radially extending fluid channels, each channel having an inlet in fluid communication with a corresponding fluid source and an outlet in communication with the bore, and (iii) a valve head fluid outlet in communication with the bore, a valve stem movably disposed within the bore of the valve head, the valve stem having an axially extending fluid channel that has a fluid outlet in communication with the valve head fluid outlet and a fluid inlet, and a valve control system for effecting rotation and axial displacement of the valve stem so as to effect fluid communication between the valve stem fluid inlet and a fluid outlet of any one of the radially extending fluid channels;

b) retracting the valve stem to terminate fluid communication between the valve stem fluid inlet and a fluid outlet of one of the radially extending fluid channels, c) rotating the valve stem so that the valve stem fluid inlet is aligned with a fluid outlet of a particular radially extending fluid channel; and d) axially displacing the valve stem so as to effect fluid communication between the valve stem fluid inlet and the fluid outlet of the particular radially extending fluid channel.

16. The method according to claim 15 wherein the valve head further includes at least one longitudinally extending drainage channel having an inlet and an outlet, the method further including the step of creating a vacuum within the drainage channel to remove residue fluid from the bore of the valve head.

17. The method according to claim 15 wherein in step (c), the valve stem is rotated from a current position directly to any other position without stopping at intervening positions.

18. The method according to claim 15 wherein the valve control unit comprises a first motor drive for rotating the valve stem and a second motor drive for axially displacing the valve stem, the method further comprising the step of generating control signals for controlling the first and second motor drives to effect rotation and axial displacement, respectively, of the valve stem.

19. The method according to claim 15 wherein rotating step (c) occurs only after retracting step (b).

20. The method according to claim 15 wherein axially displacing step (d) occurs immediately after rotating step (c).

* * * * *